United States Patent
Kang et al.

(10) Patent No.: US 11,252,730 B2
(45) Date of Patent: Feb. 15, 2022

(54) METHOD FOR PERFORMING BEAM MANAGEMENT IN WIRELESS COMMUNICATION SYSTEM AND APPARATUS THEREFOR

(71) Applicant: LG Electronics Inc., Seoul (KR)

(72) Inventors: Jiwon Kang, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/344,424

(22) PCT Filed: Jun. 8, 2017

(86) PCT No.: PCT/KR2017/005953
§ 371 (c)(1),
(2) Date: Apr. 24, 2019

(87) PCT Pub. No.: WO2018/079969
PCT Pub. Date: May 3, 2018

(65) Prior Publication Data
US 2020/0068549 A1 Feb. 27, 2020

Related U.S. Application Data

(60) Provisional application No. 62/413,418, filed on Oct. 26, 2016.

(51) Int. Cl.
*H04W 72/04* (2009.01)
*H04W 16/14* (2009.01)
(Continued)

(52) U.S. Cl.
CPC ......... *H04W 72/046* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 2012/0213261 A1* | 8/2012 | Sayana | H04L 5/0094 375/224 |
| 2013/0021929 A1* | 1/2013 | Kim | H04W 76/15 370/252 |

(Continued)

OTHER PUBLICATIONS

LG Electronics, "Measurement for mobility and beam procedure in NR," R1-1609268, emf3GPP TSG RAN WG1 Meeting #86bis, Lisbon, Portugal, Oct. 10-14, 2016, 8 pages.

(Continued)

*Primary Examiner* — Ajit Patel
*Assistant Examiner* — Liem H. Nguyen
(74) *Attorney, Agent, or Firm* — Fish & Richardson P.C.

(57) ABSTRACT

The present specification provides a beam management method in a wireless communication system. The beam management method performed by a serving base station according to the present specification comprise setting, to a UE, a plurality of beam management reference signals (RSs) for downlink beam scanning of the UE, transmitting at least one beam management reference signal to the UE through at least one transmission beam; receiving beam index information corresponding to a predetermined number of transmission beams from the UE; and based on the received beam index information, transmitting indication information for controlling a beam used for transmission of a downlink reference signal of the neighboring eNB and/or transmission of an uplink reference signal of the neighboring UE to the neighboring eNB and/or the neighboring UE.

12 Claims, 8 Drawing Sheets

Beam reporting based on measurements of RS#1 to RS#6

(51) Int. Cl.
H04W 16/28 (2009.01)
H04B 7/06 (2006.01)
H04B 7/08 (2006.01)
H04L 5/00 (2006.01)

(56) References Cited

U.S. PATENT DOCUMENTS

| | | | | |
|---|---|---|---|---|
| 2013/0343315 | A1* | 12/2013 | Tiirola | H04W 72/082 |
| | | | | 370/329 |
| 2016/0065350 | A1* | 3/2016 | Suzuki | H04W 28/18 |
| | | | | 370/329 |
| 2016/0285660 | A1* | 9/2016 | Frenne | H04B 7/0695 |
| 2018/0220313 | A1* | 8/2018 | Goldhamer | H04L 5/005 |
| 2018/0279149 | A1* | 9/2018 | Li | H04L 5/0092 |
| 2019/0173551 | A1* | 6/2019 | Wang | H04B 7/0617 |
| 2019/0268925 | A1* | 8/2019 | Hlander | H04J 11/0056 |

OTHER PUBLICATIONS

LG Electronics, "Views on NR beam management," R1-1609247, 3GPP TSG RAN WG1 Meeting #86bis, Lisbon, Portugal, Oct. 10-15, 2016, 7 pages.

ZTE Corporation, ZTE Microelectronics, "Discussion on interference issues in NR," R1-1608668, 3GPP TSG RAN WG1 Meeting #86bis, Lisbon, Portugal, Oct. 10-14, 2016, 10 pages.

LG Electronics, "Remaining details on beamformed CSI-RS enhancements," R1-166841, 3GPP TSG RAN WG1 Meeting #86, Gothenburg, Sweden, Aug. 22-26, 2016, 7 pages.

* cited by examiner

[FIG. 1]
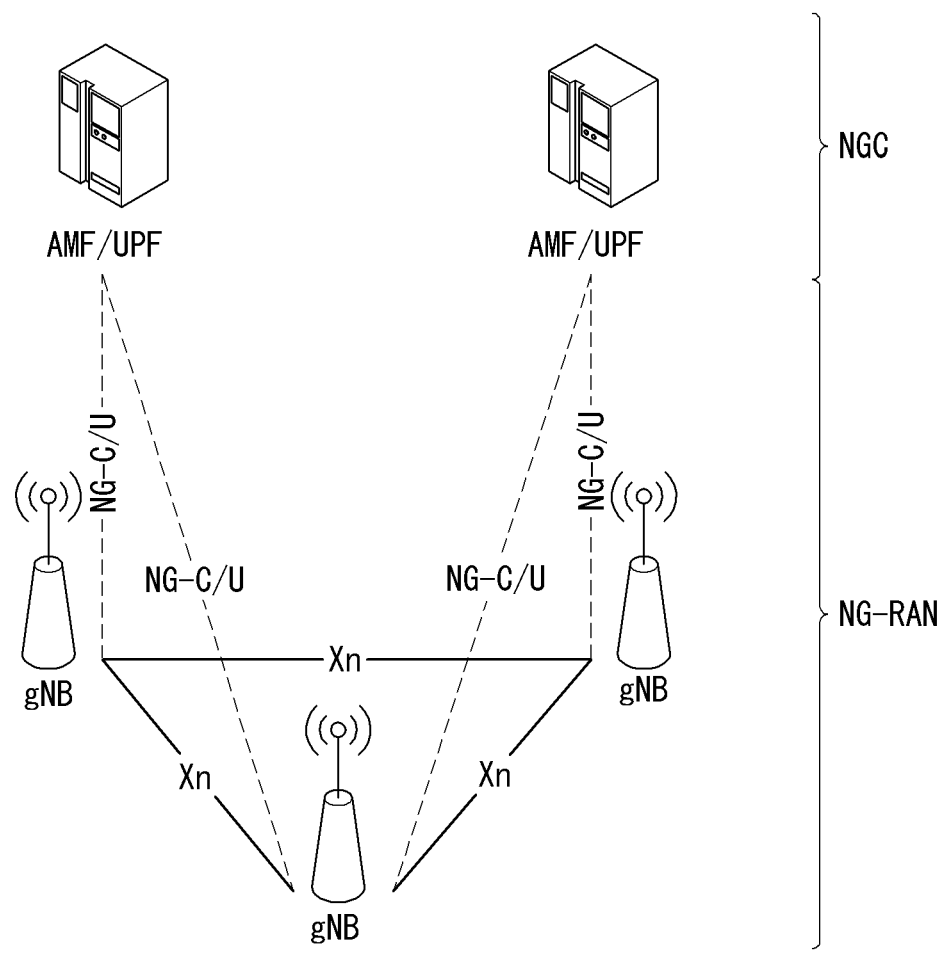

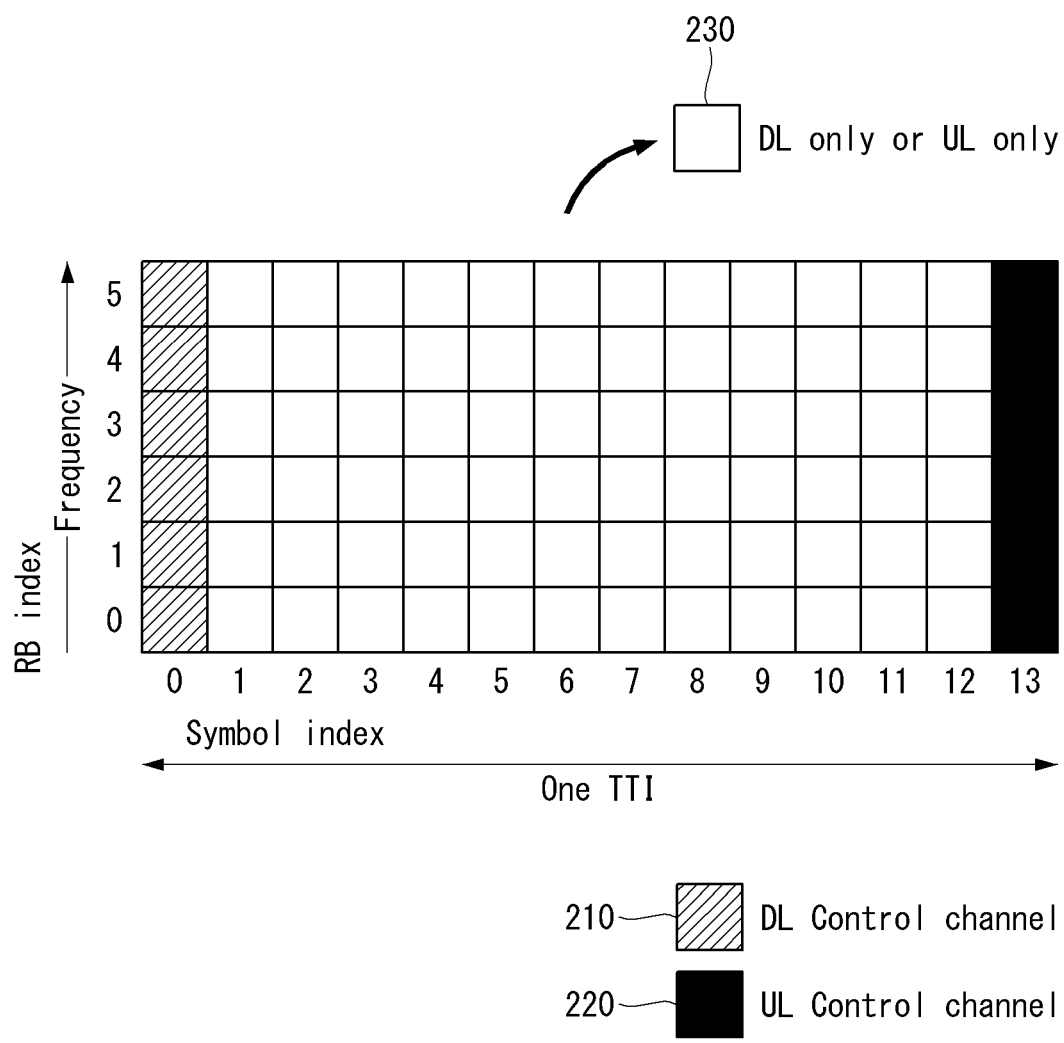

[FIG. 3]
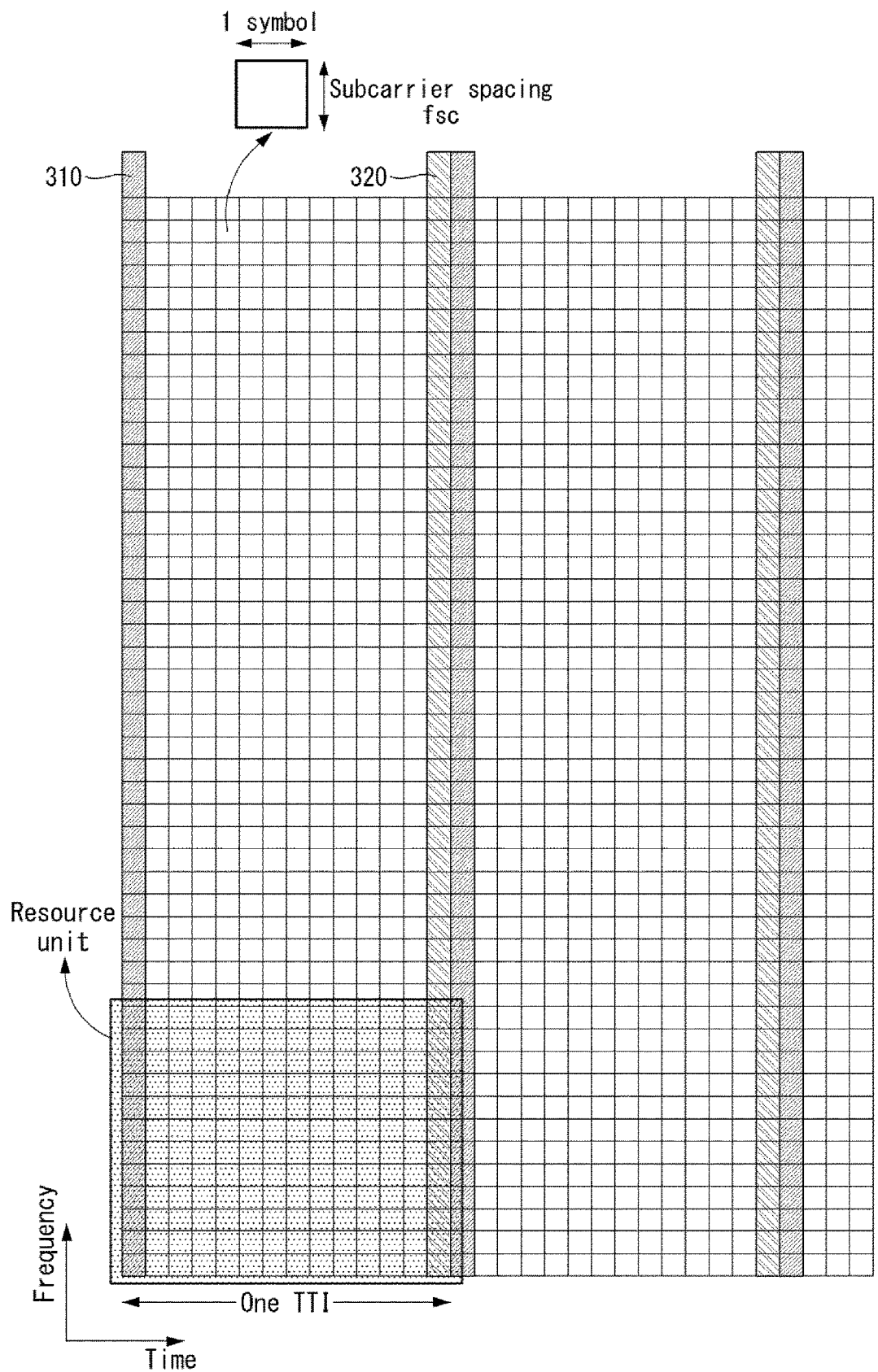

[FIG. 4]
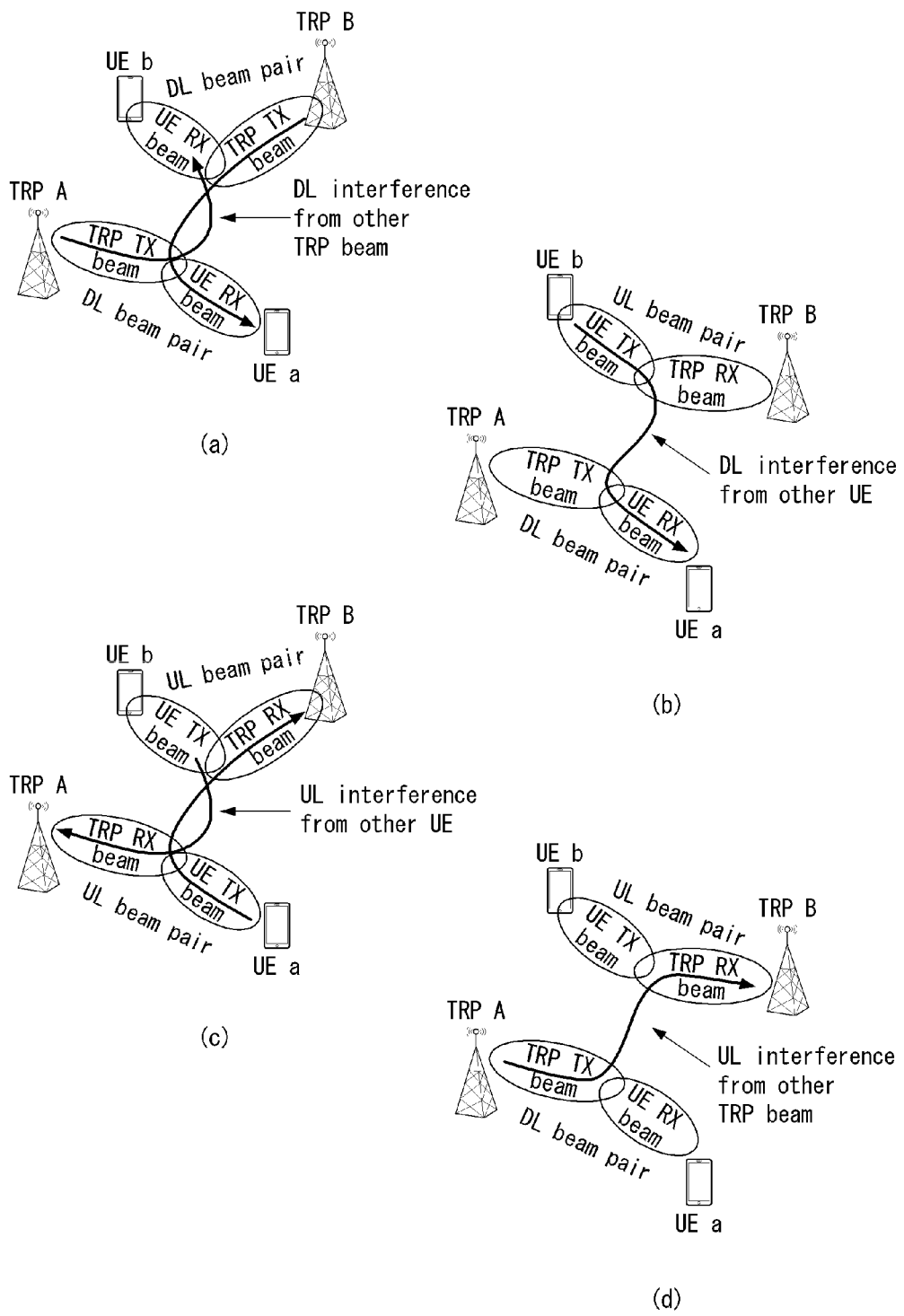

[FIG. 5]
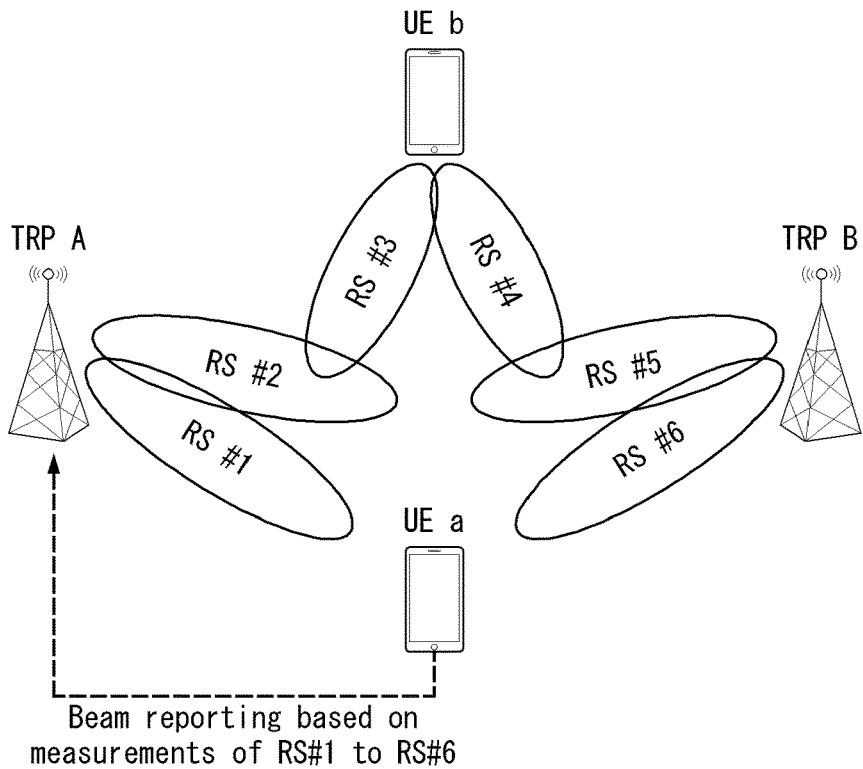
[FIG. 6]
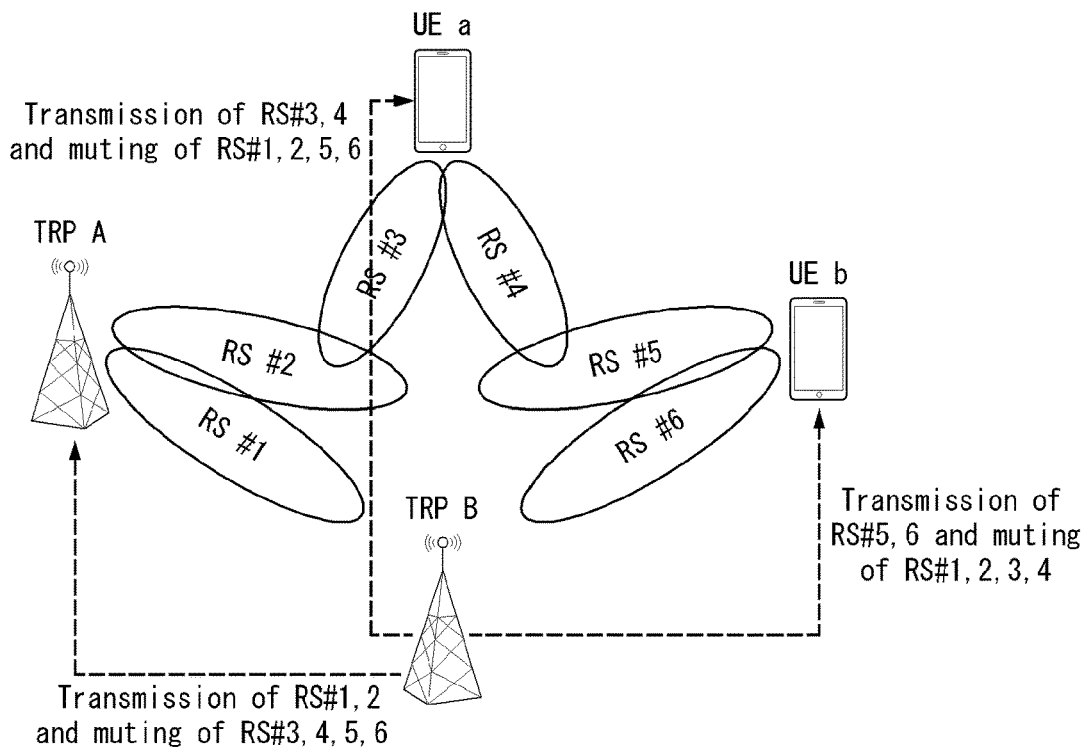

【FIG. 7】
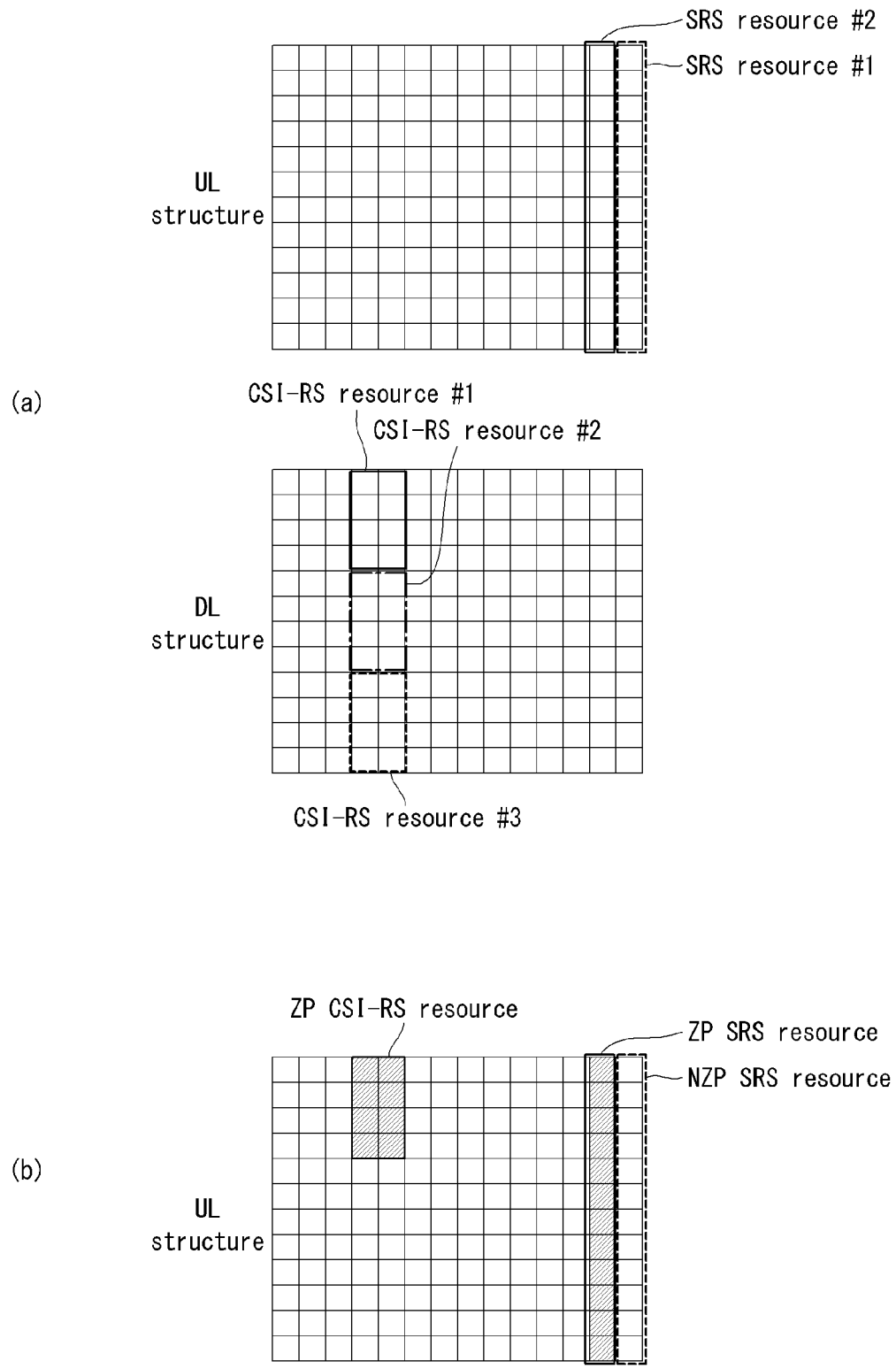

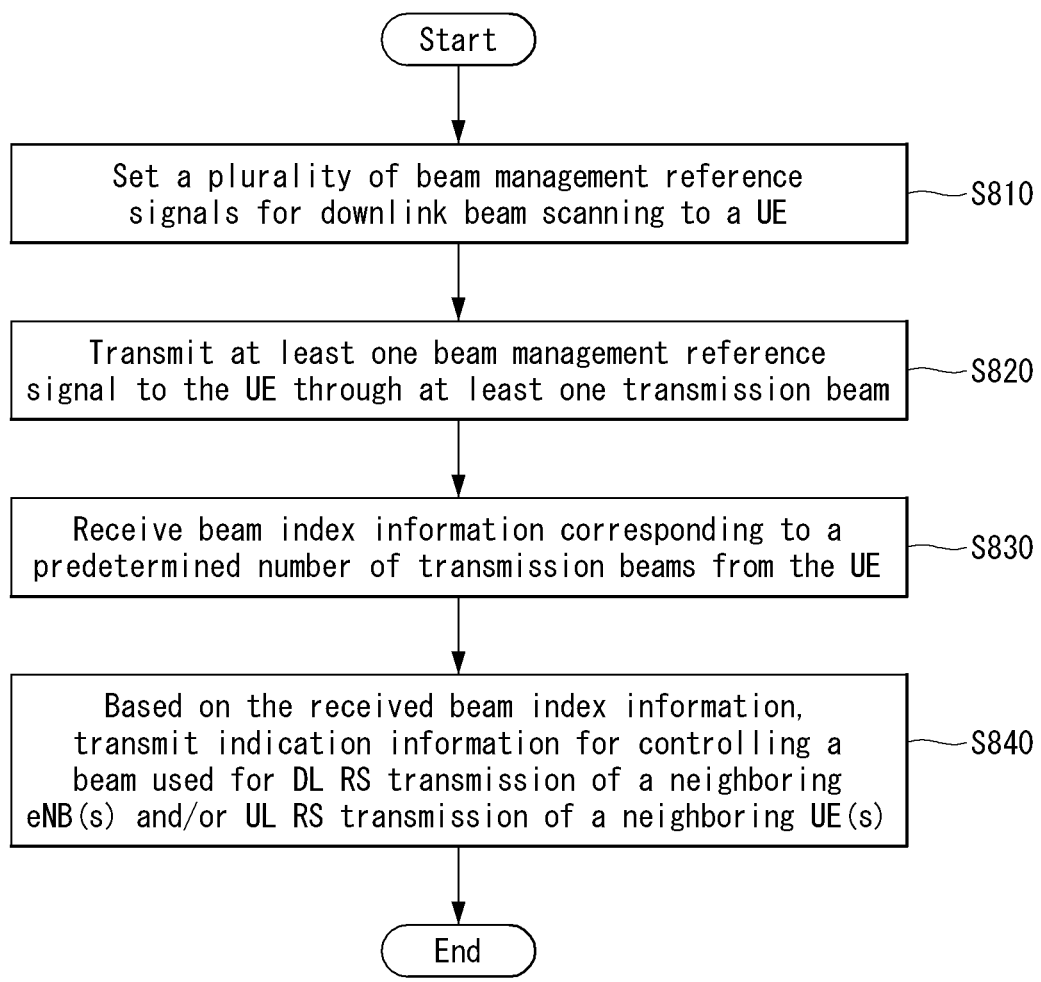

[FIG. 9]
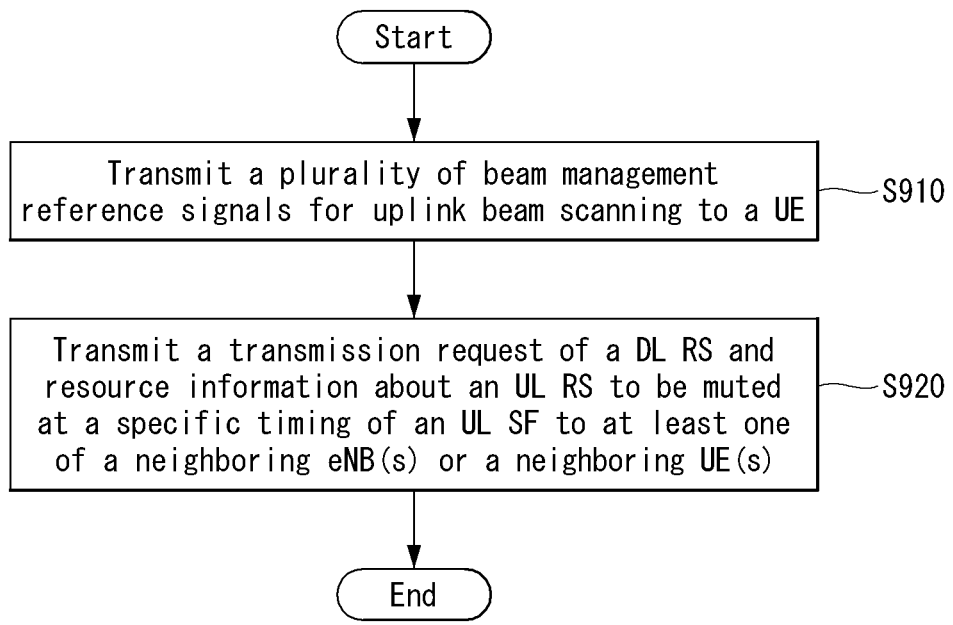
[FIG. 10]
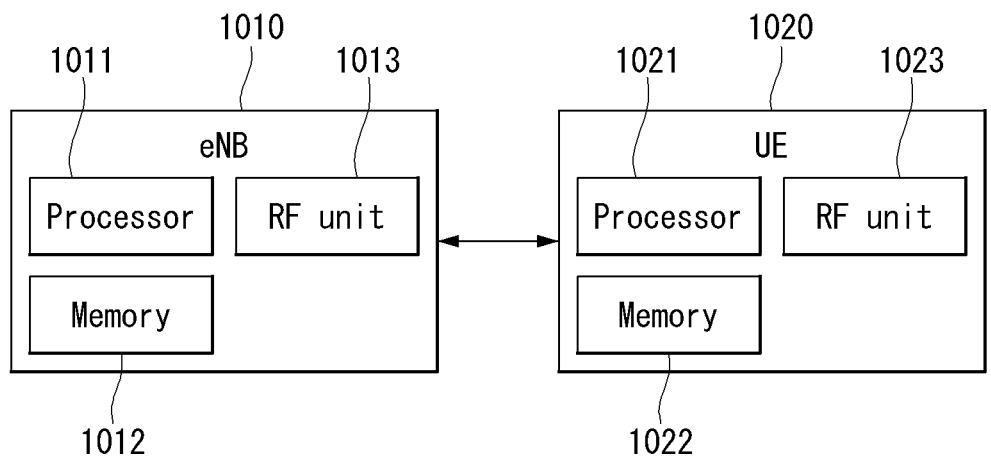

METHOD FOR PERFORMING BEAM MANAGEMENT IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2017/005953, filed on Jun. 8, 2017, which claims the benefit of U.S. Provisional Application No. 62/413,418, filed on Oct. 26, 2016. The disclosures of the prior applications are incorporated by reference in their entirety.

TECHNICAL FIELD

The present invention relates to a wireless communication system and, more particularly, to a method for performing beam management and an apparatus supporting the method.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

An object of the present invention is to provide a method for controlling inter-beam interference by providing information related to a plurality of beam management reference signals set to a terminal by a serving base station to a neighboring base station and/or neighboring terminals.

Technical objects to be achieved by the present invention are not limited to those described above, and other technical objects not mentioned above may also be clearly understood from the descriptions given below by those skilled in the art to which the present invention belongs.

Technical Solution

The present specification provides a beam management method in a wireless communication system.

A method performed by a serving base station according to the present invention comprises setting, to a terminal, a plurality of beam management reference signals (RSs) for downlink beam scanning of the terminal, wherein the plurality of beam management reference signals include at least one of a beam management reference signal transmitted from a neighboring base station or a beam management reference signal transmitted from a neighboring terminal; transmitting at least one beam management reference signal to the terminal through at least one transmission beam; receiving beam index information corresponding to a predetermined number of transmission beams from the terminal; and based on the received beam index information, transmitting indication information for controlling a beam used for transmission of a downlink reference signal of the neighboring base station and/or transmission of an uplink reference signal of the neighboring terminal to the neighboring base station and/or the neighboring terminal.

According to the present invention, the indication information instructs to exclude the predetermined number of transmission beams from being used for transmission of a downlink reference signal by the neighboring base station and/or transmission of an uplink reference signal by the neighboring terminal.

Also, according to the present invention, beam indexes corresponding to the predetermined number of transmission beams are transmission beam indexes corresponding to beam management reference signals the signal strength of which is larger than a threshold value among measurements of the plurality of beam management reference signals.

Also, according to the present invention, the beam management reference signal is a channel state information (CSI)-RS, beam RS (BRS), or synchronization signal block.

Also, the method according to the present invention further comprises transmitting control information related to a beam management reference signal configured for the terminal to at least one of the neighboring base station or the neighboring terminal.

Also, according to the present invention, the control information includes at least one of at least one position information of a time resource or frequency resource to which a beam management reference signal set to the terminal is transmitted, sequence information used for the set beam management reference signal, time and frequency synchronization information based on a downlink between the serving base station and the terminal, reference signal information used as a reference for power control, or power control command.

Also, according to the present invention, the setting a plurality of beam management reference signals to the terminal further comprises transmitting at least one of information about a downlink (DL) or uplink (UL) reference signal having a Quasi-Co Location (QCL) relationship with each beam management reference signal, sequence information used for each beam management reference signal, and grouping information about the plurality of beam management reference signals.

Also, according to the present invention, grouping information about the plurality of beam management reference signals includes information about the number of beam indexes to be provided as feedback for each beam group.

Also, according to the present invention, the beam index information corresponding to the predetermined number of transmission beams includes information representing the number of beam indexes to be provided as feedback configured for each beam group.

Also, according to the present invention, the neighboring terminal represents a terminal located in the surroundings of the terminal.

Also, another beam management method in a wireless communication system performed by a serving base station according to the present invention comprises setting, to a terminal, a plurality of beam management reference signals (RSs) for uplink beam scanning of the terminal, wherein the plurality of beam management reference signals include at least one of M1 non-zero-power (NZP) uplink reference signals, M2 zero-power (ZP) uplink reference signals, or M3 zero-power (ZP) downlink reference signals; and transmitting a transmission request of a downlink reference signal and resource information about an uplink reference signal to be muted at a specific timing of an uplink (UL) subframe to at least one of a neighboring base station or a neighboring terminal.

Also, according to the present invention, a beam management reference signal among the plurality of beam management reference signals is a sounding reference signal (SRS).

Also, according to the present invention, an uplink reference signal in the non-zero-power (NZP) uplink reference signal and the zero-power (ZP) uplink reference signal is an SRS, and a downlink reference signal in the zero-power (ZP) downlink reference signal is a channel state information-reference signal (CSI-RS).

Also, a transmission apparatus performing beam management in a wireless communication system according to the present invention comprises an radio frequency (RF) unit for transmitting and receiving a radio signal; and a processor functionally connected to the RF unit, wherein the processor is configured to set, to a terminal, a plurality of beam management reference signals (RSs) for downlink beam scanning of the terminal, wherein the plurality of beam management reference signals include at least one of a beam management reference signal transmitted from a neighboring base station or a beam management reference signal transmitted from a neighboring terminal; transmit at least one beam management reference signal to the terminal through at least one transmission beam; receive beam index information corresponding to a predetermined number of transmission beams from the terminal; and based on the received beam index information, transmit indication information for controlling a beam used for transmission of a downlink reference signal of the neighboring base station and/or transmission of an uplink reference signal of the neighboring terminal to the neighboring base station and/or the neighboring terminal.

Advantageous Effects

The present invention provides an effect of minimizing interference due to transmission of a downlink or uplink signal of a neighboring base station and/or neighboring terminal by providing beam management-related information for controlling inter-beam interference to the neighboring base station and/or neighboring terminal.

The technical effects of the present invention are not limited to the technical effects described above, and other technical effects not mentioned herein may be understood to those skilled in the art to which the present invention belongs from the description below.

DESCRIPTION OF DRAWINGS

The accompanying drawings, which are included herein as a part of detailed descriptions to help understanding the present invention, provide embodiments of the present invention and describe technical features of the present invention with detailed descriptions below.

FIG. 1 illustrates one example of the overall system structure of an NR to which a method proposed by the present specification may be applied.

FIG. 2 illustrates one example of a self-contained subframe structure to which a method proposed by the present specification may be applied.

FIG. 3 illustrates one example of the overall frame structure based on a self-contained subframe proposed by the present specification.

FIG. 4 illustrates situations where inter-beam interference is occurred.

FIG. 5 illustrates one example of a downlink beam management method proposed by the present specification.

FIG. 6 illustrates one example of an uplink beam management method proposed by the present specification.

FIG. 7 illustrates one example of a DL and UL resource structures in an uplink beam management method proposed by the present specification.

FIG. 8 is a flow diagram illustrating one example of a method for controlling inter-beam interference proposed by the present specification.

FIG. 9 is a flow diagram illustrating another example of a method for controlling inter-beam interference proposed by the present specification.

FIG. 10 illustrates a block diagram of a wireless communication device according to one embodiment of the present invention.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

DEFINITIONS OF TERMS eLTE eNB: eLTE eNB is an evolution of an eNB which supports a connection to EPC and NGC.

gNB: A node which supports not only a connection to NGC but also NR.

New RAN: A wireless access network which supports NR or E-UTRA or interacts with NGC.

Network slice: A network slice is a network defined by an operator to provide a solution optimized to a specific market scenario requiring specific requirements together with an end-to-end scope.

Network function: A network function is a logical node within network infrastructure having a well-defined external interface and a well-defined functional operation.

NG-C: A control plane interface used for an NG2 reference point between a new RAN and NGC.

NG-U: A user plane interface used for an NG3 reference point between a new RAN and NGC.

Non-standalone NR: A disposition configuration by which a gNB requires an LTE eNB as an anchor to establish a control plane connection to an EPC or by which a gNB requires an eLTE eNB as an anchor to establish a control plane connection to an NGC.

Non-standalone E-UTRA: A disposition configuration which requires a gNB as an anchor to establish a control plane connection to an NGC.

User plane gateway: An end-point of the NG-U interface.

System in General

FIG. 1 illustrates one example of the overall system structure of an NR to which a method proposed by the present specification may be applied.

Referring to FIG. 1, an NG-RAN is composed of an NG-RA user plane (a new AS sublayer/PDCP/RLC/MAC/PHY) and gNBs providing control plane (RRC) protocol endpoints for User Equipment (UE).

The gNBs are inter-connected through an Xn interface.

The gNBs are also connected to the NGC through the NG interface.

More specifically, the gNBs are connected to Access and Mobility Management Functions (AMFs) through the N2 interface and to User Plane Functions (UPFs) through the N3 interface.

New Rat (NR) Numerologies and Frame Structure

In NR, a plurality of numerologies are supported.

Numerology is defined by subcarrier spacing and CP overhead.

A plurality of subcarrier spacing may be derived by scaling the basic subcarrier spacing by an integer N.

The numerology used may be selected independently of the frequency band although it is assumed that very low subcarrier spacing is not used at very high carrier frequencies.

A flexible network and UE channel bandwidth are supported.

In view of RAN1 specification, the maximum channel bandwidth per NR carrier is 400 MHz.

In the case of at least single numerology, a candidate of the maximum number of subcarriers per NR carrier is 3300 or 6600 from a viewpoint of RAN1 specification.

Subframe duration is fixed to 1 ms, and frame length is 10 ms.

A scalable numerology has to allow a subcarrier spacing ranging at least from 15 kHz to 480 kHz.

All of the numerologies having a subcarrier spacing larger than 15 kHz are aligned at symbol boundaries every 1 ms of the NR subcarrier regardless of the CP overhead.

More specifically, the specifications for a normal CP family are selected as follows.

If the subcarrier spacing is 15 kHz*2n (where n is a non-negative integer),

Each symbol length (including CP) of the 15 kHz subcarrier spacing is the same as a sum of the corresponding 2n symbols with a scaled subcarrier spacing.

In addition to the first OFDM symbol at every 0.5 ms, all of the OFDM symbols within 0.5 ms have the same size.

The first OFDM symbol within 0.5 ms is longer than other OFDM symbols by 16 $T_S$ (where 15 kHz and an FFT size of 2048 are assumed).

The CP of the first symbol uses 16 $T_S$.

If the subcarrier spacing is 15 kHz*2n (where n is a non-negative integer),

Each symbol length (including CP) of the subcarrier spacing is the same as a sum of 2n symbols corresponding to 15 kHz.

A resource defined by one subcarrier and one symbol is called a resource element (RE).

The physical layer design supports the extended CP.

Only one extended CP may exist in a given subcarrier spacing. An LTE scaled extended CP is supported with at least 60 kHz subcarrier spacing. The CP type may be configured to be semi-static by using UE-specific signaling.

A UE which supports the extended CP may depend on the UE type/capability.

The number of subcarriers per PRB is 12.

An explicit DC subcarrier is not reserved for both of downlink and uplink.

For DC existing within a transmitter, processing of DC in a DC subcarrier at the transmitter side is specified as follows:

A receiver knows where the DC subcarrier exists, where the DC subcarrier is known to exists (by the specification or signaling), or whether the DC subcarrier exists within the receiver bandwidth.

For the case of downlink, a UE may assume that a DC subcarrier transmitted from the transmitter (gNB) has been modulated. In other words, data is not rate-matched nor punctured.

For the case of uplink, the DC subcarrier transmitted from the transmitter (UE) side is modulated, and data are not rate-matched nor punctured.

For the case of uplink, the transmitter DC subcarrier of the transmitter (UE) side has to avoid collision with at least DMRS if possible.

For the case of uplink, at least one specific subcarrier has to be defined as a candidate position of the DC subcarrier, and for example, the DC subcarrier is located at the boundary of a PRB.

For the case of uplink, a means for determining the position of a DC subcarrier by a receiver has to be specified.

This is related to the DC subcarrier position specified in the semi-static signaling from a UE and a related standard.

If a DC subcarrier does not exist, all of the subcarriers within the receiver bandwidth are transmitted.

On the other hand, for the receiver side, RAN1 specification does not define a special handling of the DC subcarrier. Operation specifications are left as an implementation issue, and accordingly, a receiver may puncture the data received from the DC subcarrier.

A slot is defined by 7 or 14 OFDM symbols based on the same subcarrier spacing having a normal CP up to 60 kHz and is defined by 14 OFDM symbols based on the same subcarrier spacing having a normal CP higher than 60 kHz.

A slot may include all of the downlinks, all of the uplinks, or at least one downlink part and at least one uplink part.

A slot set is supported and in other words, data transmission may be scheduled with one slot spacing or with a plurality of slot spacing.

A mini-slot is defined, which has the following length.

A mini-slot having a length of one symbol with duration of at least 6 GHz or higher is supported.

Lengths ranging from 2 to a slot length of −1

In the case of URLLC, at least two slots are supported.

When a slot level channel/signal/procedure is defined, the following issues need to be considered.

Possible occurrence of mini-slot/slot transmissions occupying resources scheduled for ongoing slot transmission(s) of a given carrier with respect to the same/different UEs.

At least one of the DMRS format/structure/configuration for a slot level data channel is reduced as a mini-slot level data channel.

At least one of the DL control channel format/structure/configuration for slot level data scheduling is designed to be applied to mini-slot level data scheduling.

At least one of the UL control channel format/structure/configuration for slot level UCI feedback is designed to be applied to mini-slot level UCI feedback.

To design a mini-slot, the following use cases have to be considered.

Support of a very low delay time including URLLC with respect to a specific slot length A target slot length is at least 1 ms or 0.5 ms.

In particular, when TxRP uses beam-sweeping (for example, 6 GHz or more), a more precise TDM for the same or different UE with a slot NR-LTE co-existence Forward compatibility for non-authorized spectrum operation Beam Management In NR, beam management is defined as follows.

Beam management: TRP(s) that may be used for transmission and reception of DL and UL and/or a set of L1/L2 procedures for obtaining and maintaining a set of UE beams, which includes at least following functions.

Beam determination: TRP(s) or UE's selection of its own transmission/reception beam Beam measurement: TRP(s) or UE's measurement of the characteristic of a received beam formation signal Beam report: UE's reporting information of a beam-formed signal based on beam measurement Beam sweeping: An operation for covering a spatial area by using a transmitted and/or received beam for a time period according to a predetermined scheme.

Also, Tx/Rx beam correspondence in the TRP and UE is defined as follows.

Tx/Rx beam correspondence at a TRP is maintained if at least one of the following conditions is satisfied.

A TRP may determine a TRP reception beam for uplink reception based on a downlink measurement of a UE with respect to at least one or more transmission beams of the TRP.

A TRP may determine a TRP Tx beam for downlink transmission based on an uplink measurement of the TRP with respect to at least one or more Rx beams of the TRP.

Tx/Rx beam correspondence in a UE is maintained if one or more of the following conditions are satisfied:

A UE may determine a UE Tx beam for uplink transmission based on a downlink measurement of the UE with respect to one or more Rx beams of the UE.

A UE may determine a UE Rx beam for downlink reception based on the indication of the TRP based on an uplink measurement with respect to one or more Tx beams.

A capability indication of UE beam correspondence-related information is supported for a TRP.

The following DL L1/L2 beam management procedure is supported within one or a plurality of TRPs.

P-1: This procedure is used for allowing UE measurement of different TRP Tx beams to supports selection of TRP Tx beam/UE Rx beam(s)

Beamforming at a TRP usually includes intra/inter-TRP Tx beam sweeping in a different beam set Beamforming at a UE usually includes UE Rx beam sweeping from a set of different beams.

P-2: This procedure is used for allowing UE measurement of different TRP Tx beams to change inter/intra TRP Tx beam(s).

P-3: This procedure is used for allowing UE measurement of the same TRP Tx beam to change UE Rx beams when the UE uses beamforming.

A non-periodic report triggered at least by the network is supported by P-1, P-2, and P-3 related operation.

UE measurement based on an RS for beam management (at least CSI-RS) is composed of K (the total number of beams) beams, and the UE reports a measurement result of N selected Tx beams.

Here, N is not necessarily a fixed number. A procedure based on an RS for the purpose of mobility is not excluded.

At least for the case of N<K, reported information includes information about the amount of measurement of N beam(s) and N DL transmission beams.

In particular, the UE may report N' CSI-RS resource indicators (CRIs) with respect to non-zero power (NZP) CSI-RS resources where K'>1.

The UE may be configured by the following higher layer parameters for beam management.

N≥1 report setting and M≥1 resource setting

Links between report setting and resource setting are configured by an agreed CSI measurement configuration.

CSI-RS based P-1 and P-2 are supported by resource and report configuration.

P-3 may be supported regardless of existence of the report setting.

Report setting which includes at least the followings.

Information representing a selected beam

L1 measurement report

Time domain operation: For example, non-periodic, periodic, or semi-periodic operation Frequency granularity when various frequency granularities are supported.

Resource configuration which includes at least the followings.

Time domain operation: For example, non-periodic, periodic, or semi-periodic operation RS type: at least NZP CSI-RS At least one CSI-RS resource set. Each CSI-RS set includes CSI-RS resources where K≥1.

Part of parameters of K CSI-RS resources may be the same with each other. For example, a port number, time domain operation, density, and period may be the same.

The NR also supports the following beam reporting by taking into account L groups where L>1.

Information representing a minimal group

The amount of measurement for N1 beams (Measurement quantity) L1 RSRP and support of CSI reporting (when a CSI-RS acquires CSI).

If applicable, information representing N1 DL transmission beams.

As described above, group-based beam reporting may be configured in UE units.

For example, the group-based beam reporting may be turned off in UE units when L=1 or N1=1.

The NR supports the UE to trigger a mechanism for recovering from a beam failure event.

A beam failure event occurs when quality of a beam pair link of an associated control channel is sufficiently low (for example, comparison with a threshold value or timeout of an associated timer). The mechanism for recovering from a beam failure (or ineffectiveness) is triggered when a beam failure occurs.

The network explicitly configures the UE which has a resource for transmitting an UL signal for the purpose of recovery.

Configuration of resources is supported from where an eNB listens to all or part of the directions (for example, random access region).

The UL transmission/resource which reports a beam failure may be positioned at the same time instance of a PRACH (a resource orthogonal to a PRACH resource) or at a different time instance from the PRACH (which may be configured with respect to a UE).

Transmission of a DL signal is supported so that a UE may monitor beams to identify new potential beams.

The NR supports beam management irrespective of a beam-related indication.

If a beam-related indication is provided, information about formation of UE-side beams used for CSI-RS based measurement/information about a reception procedure may be indicated to the UE through QCL. QCL parameters to be supported in the NR may include not only the parameters for delay, Doppler, or average gain used in the LTE system but also the spatial parameters for beamforming in the receiver side; and angle of arrival (AOA)-related parameters in a viewpoint of UE reception beamforming and/or angle of departure (AOD) related parameters in a viewpoint of eNB reception beamforming may be included.

The NR supports the same or different beams in the transmission of a control channel and the corresponding data channel.

For NR-PDCCH transmission supporting robustness against beam pair link blocking, a UE may be configured to monitor an NR-PDCCH on M beam pair links simultaneously.

Here, W≥1, and the maximum value of M may depend on at least the UE capability.

A UE may be configured to monitor an NR-PDCCH on a different beam pair link(s) at different NR-PDCCH OFDM symbols.

Parameters related to UE Rx beam configuration for monitoring an NR-PDCCH on a plurality of beam pair links are configured by higher layer signaling or MAC CE and/or considered in a search space design.

At least, the NR supports an indication of spatial QCL assumption between DL RS antenna port(s) for demodulation of a DL RS antenna port(s) and DL control channel.

A method for candidate signaling for beam indication with respect to an NR-PDCCH (namely a configuration method for monitoring an NR-PDCCH) is MAC CE signaling, RRC signaling, DCI signaling, spec-transparent and/or implicit method, and a combination of these signaling methods.

For reception of unicast DL data channel, the NR supports an indication of spatial QCL assumption between a DL RS antenna port and a DMRS antenna port of a DL data channel.

The information representing an RS antenna port is expressed through DCI (downlink permission). This information represents an RS antenna port QCLed with a DMRS antenna port.

A different set of DMRS antenna ports with respect to a DL data channel may be expressed by being QCLed with a different set of the RS antenna port.

Self-Contained Subframe Structure

In the TDD system, to minimize latency of data transmission, the fifth-generation New RAT (NR) considers a self-contained slot structure as shown in FIG. 2.

Namely, FIG. 2 illustrates one example of a self-contained subframe structure to which a method proposed by the present specification may be applied.

In FIG. 2, the area 210 filled with diagonal lines represents a downlink control (DC) area, and the area 220 filled with black color represents an uplink control area.

The unfilled area 230 may be used for downlink data transmission or for uplink data transmission.

A characteristic of this structure is that DL transmission and UL transmission are performed sequentially within one slot; and DL data are transmitted and UL Ack/Nack may be transmitted and received within one slot.

Such a slot may be defined as a 'self-contained slot'.

In other words, through the slot structure, an eNB may reduce the time required to retransmit data to a UE at the occurrence of data transmission error and accordingly minimize the resultant latency in data transmission.

In the self-contained slot structure described above, an eNB and a UE require a time gap for switching from a transmission mode to a reception mode or from the reception mode to the transmission mode.

To this purpose, in the corresponding slot structure, part of OFDM symbols at the time the operating mode is switched from the DL to the UL mode are configured as a guard period (GP).

FIG. 3 illustrates one example of the overall frame structure based on a self-contained subframe proposed by the present specification.

As described above, it may be seen that a DL control channel is transmitted by being TDMed with a DL data 310 or UL data 320 through a broadband.

In view of an eNB, a DL control channel may be transmitted over the whole frequency band, but from a viewpoint of a UE, the DL control channel may be received through a specific frequency band rather than through the whole frequency band.

Here, the DL control channel refers to control information delivered from an eNB to a UE, which may include not only DL-specific information such as DL scheduling assignment but also UL-specific information such as information about cell configuration and UL grant that the UE has to know.

As shown in FIG. 3, the New RAT (NR) may also define a basic resource unit (RU) for DL/UL scheduling as in the conventional LTE system, but for the sake of convenience, the basic resource unit will be referred to as a resource block (RB) which is a default unit used in the conventional LTE system.

In other words, the basic resource unit (RU) may include a plurality of OFDM symbols along the time axis and include a plurality of sub-carriers along the frequency axis.

The basic resource block (RB) may be defined to have a different size for DL and UL.

The eNB may perform scheduling of DL data or UL data in RB units, namely in an integer number of RB units.

In FIG. 3, one cell of time-frequency resource grids, namely one symbol length and one subcarrier may be defined as one resource element (RE).

As one example, in the New RAT referred to as mmWave and 5G, system bandwidth is expected to be larger than at least 100 MHz, and one subframe may be defined as a short TTI with a length of 0.1 ms or 0.2 ms.

New Rat has a high frequency band, and subcarrier spacing is expected to be at least five times that of the conventional LTE system, which is 15 kHz.

Therefore, in the New Rat, it is assumed that subcarrier spacing is 75 kHz, and one RB has 12 subcarriers along the frequency axis and one subframe along the time axis.

Flexible operations based on the TDD scheme in the NR will be briefly described below.

In NR, different cells/transmission and reception points (TRPs) have a different TDD configuration according to dynamically changing downlink (DL) and uplink (UL) traffic demand.

In LTE, this feature was supported by the enhanced Interference Management and Traffic Adaptation (eIMTA) work item.

In NR, this unbalanced traffic situation may be more common due to reduced cell coverage, and NR is considering adoption of dynamically controllable DL/UL TDD framework (for example, dynamic indication of DL and UL at each subframe).

Next, described will be interference types of the multi-beam based operations among flexible operations for the TDD scheme.

In NR, a multi-beam based operation has to be supported where analog or hybrid beamforming may be applied at a TRP and/or UE.

If multi-beam based operations are taken into account at a TRP/UE, DL/UL interference is more complex to be controlled.

For downlink, a beam(s) transmitted from other UE(s) may exert interference on data and control reception at a UE in addition to intra-/inter-TRP beam(s).

Similarly, for uplink, a beam(s) transmitted from other TRP(s) may exert interference on data and control reception at a TRP in addition to a beam(s) transmitted from a neighboring UE.

For DL, interference from intra-/inter-TRP beam(s) may be avoided by the UE measurement and report procedures.

However, it is difficult to know which neighboring UE beam(s) exerts more severe interference on which UE.

Now, described will be a method for controlling DL beam interference from an intra-/inter-Transmission and Reception Point (TRP) beam or neighboring UE beam collectively.

In other words, (1) a DL beam management method and a (2) UL beam management method which take into account neighboring TRP(s) and neighboring UE(s) proposed by the present specification will be described in detail.

Also, as an entity which manages a TRP, the network described in the present specification may be interpreted to be the same as an eNB.

Also, the network, TRP, and eNB may be interpreted to be the same with each other.

Also, an eNB according to the present specification may be expressed as a gNB which represents a New Rat (NR) node, and a Transmission and Reception Point (TRP) may indicate an antenna array (including one or more antenna elements) that may be used in a network over a specific geographic area.

Also, a DL beam pair represents a pair of a transmission beam of an eNB and a reception beam of a UE while an UL beam pair represents a pair of a transmission beam of the UE and a reception beam of the eNB.

The DL beam pair and the UL beam pair may be different from each other.

FIG. 4 illustrates situations where inter-beam interference is occurred.

FIG. 4a represents DL interference from a different TRP beam; FIG. 4b represents DL interference from a different UE beam; FIG. 4c represents UL interference from a different UE beam; and FIG. 4d represents UL interference from a different TRP beam.

First Embodiment

The first embodiment is related to a DL beam management method which takes into account a neighboring TRP and a neighboring UE.

First, the network configures a UE to receive a plurality of reference signals for a downlink (DL) beam scanning/tracking process.

The network may represent a serving eNB or a serving TRP of the UE.

From the time/frequency resource configured for receiving the plurality of reference signals, a serving eNB (or serving TRP) of the UE, neighboring eNB (or neighboring TRP) and/or other neighboring UE(s) of the UE transmits a downlink reference signal.

In the present specification, the expression of 'A and/or B' may be interpreted to convey the same meaning as cat least one of A or B'.

Afterwards, a UE which performs the downlink scanning process provides the indexes corresponding to N (where N is a natural number) transmission beams to the network as feedback.

Afterwards, the network which has received feedback information from the UE instructs to exclude the beam(s) corresponding to the indexes obtained from the feedback information when a specific time/frequency resource transmits a downlink signal to the neighboring eNB(s) and/or when a specific time/frequency resource transmits an uplink signal to a UE(s).

Here, a specific time/frequency resource may indicate a time/frequency resource or part of the time/frequency resource configured for receiving a plurality of reference signals.

Here, the reference signal indicates a reference signal for beam management for which a CSI-RS, beam RS (BRS), or synchronization signal (SS) block may be used for this purpose. It should be noted that in NR, a synchronization signal (SS) may also be transmitted by applying beamforming to ensure coverage. Therefore, a structure where synchronization signals corresponding to a plurality of separate beams are transmitted repeatedly may be supported.

Here, a basic SS resource unit corresponding to a single beam is called an CSS block'.

Therefore, since the beam is different for each SS block, an SS block may also be used for downlink beam management. Here, each SS block is supposed to have a structure including a PBCH, and as a result, an SS block indicator may also be reflected in the form of an indicator for a PBCH DMRS resource (for example, time/frequency index, port index). By taking into account the reference signal overhead, one SS block may transmit a beam with a relatively lower spatial resolution (for example, with a wider beam width) than that of the CSI-RS.

The first embodiment will be described with reference to one example.

UE a is assumed to be configured by the network to measure 20 BRSs/BRRSs.

Out of the 20 BRSs/BRRSs, 10 are reference signals transmitted from TRP A; 6 from TRP B; and 4 from UE b.

The UE a selects 4 BRSs/BRRs which exhibit the largest signal strength from the 20 BRSs/BRRSs and provides beam indexes corresponding to the selected BRSs/BRRSs to the network as feedback.

For example, it is assumed that among the four beam indexes selected by the UE a, two indexes belong to TRP A Tx beam; one to TRP B Tx beam; and the other one to UE b Tx beam.

In this case, the network which has received feedback information from the UE a uses the TRP A Tx beam information (and TRP B Tx beam information) as a downlink Tx beam for receiving a signal of the UE a.

Also, the network uses the TRP B Tx beam information as neighboring eNB Tx beam information (eNB beam scheduling information) to be avoided at the time of receiving a signal of the UE a and uses the UE b Tx beam information as neighboring UE Tx beam information (UE beam scheduling information) to be avoided at the time of receiving a signal of the UE a.

As described in the embodiment above, when not only a serving eNB but also a neighboring eNB and a neighboring UE transmit a reference signal for beam measurement, the types of reference signals may be different as the signal transmitted by eNBs becomes a downlink reference signal while the signal transmitted by a neighboring UE(s) becomes an uplink reference signal. Also, the types of downlink reference signals of a serving eNB and neighboring eNB(s) may also be different. As one example, the serving eNB may generate beams more densely and transmit/designate CSI-RS resources as beam reference signals while neighboring eNB(s) may transmit/designate an SS block to which beams are transmitted in a relatively coarse manner as a beam reference signal.

FIG. 5 illustrates one example of a downlink beam management method proposed by the present specification.

In other words, FIG. 5 illustrates an embodiment to which a method for transmitting a reference signal (RS) proposed by the present specification is applied.

Referring to FIG. 5, UE a receives 6 beam management reference signals (RS #1 to RS #6) from a serving TRP (TRP A), neighboring TRP (TRP B), and neighboring UE (UE b).

It may be seen that RS #1 and RS #2 are transmitted from TRP A; RS #3 and RS #4 are transmitted from UE b; and RS #5 and RS #6 are transmitted from TRP B.

In other words, UE a provides 6 beam indexes corresponding to 6 beam management reference signals to the network as feedback, and the network utilizes RS #1 and RS #2 as the RS of a downlink Tx beam with respect to UE a.

Also, the network uses RS #5 and RS #6 as the RS of a neighboring TRP Tx beam to be avoided at the time of receiving a signal of UE a and uses RS #3 and RS #4 as the RS of a neighboring UE Tx beam to be avoided at the time of receiving a signal of UE a.

To perform the DL beam management operation described above, a serving eNB (or serving TRP) transmits at least one of the following information to other UE(s) and/or other eNB(s) transmitting a (beam management) reference signal.

(1) Type, time and/or frequency resource position information of a configured reference signal:

As described above, the type of the reference signal may include not only downlink signals such as a CSI-RS or SS block but also an uplink signal (for example, SRS) or sidelink signal transmitted by a UE. As one example, the time and/or frequency resource position information may include the position of a symbol and subcarrier within a PRB, subframe/slot offset, bandwidth and position of a subband/partial band of the reference signal.

(2) Sequence Information of a Configured Reference Signal

Even if a reference signal is transmitted at the same time/frequency position, since a different sequence may be used according to type of the reference signal, sequence information may be indicated. For example, if the reference signal is a CSI-RS, the CSI RS sequence information may be as follows.

In other words, the sequence $r_{l,n_s}(m)$ used for CSI-RS transmission may be defined by the mathematical equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad [\text{Eq. 1}]$$

$$m = 0, 1, \ldots, N_{RB}^{max,DL} - 1$$

Here $n_s$ represents a slot number of a radio frame, and l represents the number of an OFDM symbol within a slot.

Also, the pseudo-random sequence c(i) may be defined by the mathematical equation 2 below.

$$c(n)=(x_1(n+N_c)+x_2(n+N_c))\mod 2 x_1(n°31)=(x_1(n+3)+x_1(n))\mod 2 x_2(n+31)=(x_2(n+3)+x_2(n+2)+x_2(n+1)+x_2(n))\mod 2 \quad [\text{Eq. 2}]$$

In Eq. 2, $N_c$ is 1600, and $x_1(0)=1$, $x_1(n)=0$, $n=1,2, \ldots, 30$.

(3) Time/Frequency Synchronization Information and/or Power Control information based on a downlink between a serving eNB (or serving TRP) and the corresponding UE For example, the time/frequency synchronization information may include timing advance (TA) for other UE(s), frequency offset, reference signal information used as a reference for power control, and power control command.

In the case of timing advance, a UE adjusts uplink timing synchronization based on a serving eNB of the corresponding UE; however, in the case above, it is necessary to adjust timing synchronization based on a neighboring UE. Therefore, an eNB may directly indicate the corresponding timing advance difference or may indicate a signal transmitted by a neighboring terminal to help the UE calculate the timing advance value.

In the case of a frequency offset, since characteristics of a unique oscillator may differ for each device, frequency synchronization may be different for each device. Although a UE usually synchronizes frequency to a serving eNB based on a downlink signal, in the case above, it may be necessary to perform a process for synchronizing frequency with respect to a neighboring target UE and transmitting a reference signal. To this purpose, an eNB may directly measure the frequency synchronization difference and indicate the corresponding value to the corresponding UE or may indicate a signal transmitted by a neighboring UE to help the UE calculate a frequency synchronization value based on the corresponding signal.

Also, in the case of a UE, power control is performed with respect to a serving eNB of the corresponding UE; however, power control has to be performed so that power received by a neighboring UE reaches a level as closely as possible to the downlink Rx power of the corresponding UE in order to prevent an RF problem such as automatic gain controller (AGC) saturation when a beam-related reference signal is received. To this end, a reference signal used as a reference for open loop power control may be substituted by a signal transmitted from a neighboring UE, or power boosting or deboosting command may be indicated through closed loop power control.

In FIG. 6, the network may instruct UE b to transmit an UL SRS to a resource configured to receive a DL CSI-RS or BRS of UE a.

In this case, the sounding reference signal (SRS) may use a unique pattern or have the same pattern as the CSI-RS.

Here, the same pattern may indicate that the CSI-RS and SRS have the same RE mapping position, the same sequence, and the same OCC type.

As described below, an opposite case may also be performed. In other words, the network may instruct UE b to transmit a DL CSI-RS to a resource configured to transmit an UL SRS or BRS of UE a.

Among the (1) to (3) information, since the information (3) may be obtained only when RF characteristics and radio channel information of other UEs and eNBs are known in an actual network, it is not easy to provide accurate information.

Therefore, to replace or supplement the information (3), the following descriptions are given additionally.

(Method 1)

When the network configures a UE to receive a plurality of reference signals for beam management, the network may transmit one or more of the following information to the UE.

Information about other DL/UL reference signal Quasi-CoLocated (QCLed) with each reference signal Sequence information applied to each reference signal Reference signal grouping information: This grouping information is used for reporting feedback to the network by the UE on a group basis.

Here, when the properties of a channel to which a symbol on one antenna port is transmitted may be inferred from a channel to which a symbol on another antenna port, the two antenna ports are regarded as being in a QCL relationship.

The properties may include one or more of delay spread, Doppler spread, Doppler shift, average gain, and average delay. Also, as described above, the properties may include one or more spatial parameters for Rx beamforming.

As one example of method 1, as shown in FIG. 5, the network configures a UE to receive a CSI-RS port or resource #1 to #6; however, the network may inform the UE that RS #1 and #2 are QCLed with a DL signal (for example, PSS, SSS, BRS, SS block) transmitted from TRP A; and RS #5 and #6 are QCLed with the DL signal (for example, PSS, SSS, BRS, SS block) transmitted from TRP B.

In addition, the network may inform that RS #3 and RS #4 are QCLed with an UL signal (for example, discovery RS, SRS) transmitted by UE b.

Here, one thing to note is that a QCL relationship between part of DL beam management RSs and a specific UL RS may be indicated to support transmission of a beam management RS of a neighboring UE (for example, UE b).

For example, a parameter which indicates a QCL relationship between the DL beam management RS and a specific UL RS may be expressed by a spatial parameter.

The spatial parameter may indicate that a beam management reference signal (for example, CSI-RS) is QCLed with a DMRS of a PDSCH.

In other words, a UE may assume through the spatial parameter that a beam transmitted by the DMRS of a PDSCH is the same as the beam transmitted by a beam management reference signal (for example, CSI-RS).

In other words, the spatial parameter may be a parameter which instructs to set (or adjust) a beam transmitted by the DMRS of a PDSCH to the beam through a CSI-RS is received.

Also, since a sequence applied to a beam management RS transmitted by a neighboring UE/eNB may be different from a sequence applied to a beam management RS transmitted by a serving eNB, the network may indicate information of the sequence applied to a beam management RS transmitted to the corresponding UE by a neighboring UE/eNB.

Also, the network may indicate a reference signal transmitted from the same interference source/device or the same type of source/device or grouping information about antenna ports to a UE.

The UE which receives reference signal grouping information from the network may configure feedback information as follows and provide the information to the network as feedback.

As a special case of the first embodiment, a UE may be made to perform a procedure for measuring and reporting a TRP beam and a procedure for measuring and reporting a neighboring UE beam separately.

In this case, the network may configure a downlink beam management process for a specific UE but may configure so that an entity transmitting an RS during the DL beam management process is composed only of a neighboring UE(s) or intra-/inter-TRPs.

Also, it is possible for the network to configure the TRP beam management procedure and the neighboring UE beam management procedure separately.

Although an RS for the neighboring UE beam management may be an UL RS (for example, SRS), and an RS for TRP beam management may be a DL RS (for example, CSI-RS or BRS), if the time/frequency resource and sequence of the two RSs are designed separately, the two procedures may be designed independently from each other.

For example, according to the RS type as shown below, different DL beam management types may be newly defined.

Type 1 DL beam management: Beam management RS=DL CSI-RS

Type 2 DL beam management: Beam management RS=DL SS block (or BRS or RRM-RS or mobility RS (MRS))

Type 3 DI beam management: Beam management RS=UL SRS

Here, since type 3 DL beam management is related to measurement of beam interference between UEs, it may also be expressed as sidelink (SL) beam management.

Also, it is possible to configure the slot type of a resource (for example, subframe, slot, or subband/wideband) for measuring interference at the time of the type 3 DL beam management to be UL or SL rather than DL.

For example, if the slot type is configured to be UL slot, a UE which is supposed to measure beam interference may receive an RS rather than transmit an RS to a specific UL RS resource (for example, SRS) of UL slot type.

In other words, only the physical signal and physical channel configuration within a subframe or slot follow the UL configuration, and an operation for receiving a signal is actually performed as in the DL.

Also, it may not be desirable to allocate a specific time/frequency/sequence resource to aggressor UEs to measure beam interference among UEs in terms of network delay and system resource efficiency.

Therefore, for the type 3 beam management, the network may be configured so that if an UL RS exhibiting signal strength larger than specific strength is discovered while a specific time/frequency resource for a victim UE is monitored periodically or aperiodically, the corresponding RS information (for example, resource index, root index, and cyclic shift index of an SRS) or the corresponding beam ID (ID of a beam transmitted by an UL RS strength of which is larger than specific strength) is reported to an eNB.

Similarly, a UE may select an UL RS corresponding to the best N and report the corresponding RS information or the corresponding beam ID to the eNB.

Here, the specific time/frequency resource corresponds to a resource by which UEs in the neighborhood of the victim UE may transmit an UL RS.

At this time, part of the UEs may transmit UL RSs by applying a plurality of different beamforming thereto at the specific time/frequency resource.

For the efficiency of UL RS resources, the network may make neighboring UEs transmit an UL RS by applying different orthogonal/quasi-orthogonal sequences in the same time/frequency resource area.

At this time, depending on the number of UE Tx beams, an aggressor UE transmitting an UL RS only in a part of the time/frequency resource area may exist.

The method 1 described above may be applied to find not only the beam interference among UEs but also the beam interference of a neighboring eNB.

(Method 2)

The network configures a specific time/frequency resource for a UE as a beam measurement area or beam scanning area.

The UE performs blind detection on the whole of the specific time/frequency resources or candidate RS resources (for example, a sequence, cyclic shift value, orthogonal code cover, or time/frequency resource position) preconfigured by the network; and for a signal having strength larger than a specific threshold and/or signals corresponding to the signal strength of the best N signals, the UE reports the corresponding beam ID or information (for example, a resource index, root index, or cyclic shift index of an RS) corresponding thereto to the network.

Here, regarding the best N, N is a value equal to or larger than 1, which may be a value configured through downlink signaling by the network or a predefined value.

Also, the UE may determine the N value.

For example, the UE may report all of the information about signals exhibiting strength larger than a specific threshold.

(Method 3)

Also, a UE which has received reference signal grouping information from the network may select as many beam indexes as the number configured for each group in configuring feedback information for N Tx beam indexes.

For example, it is assumed that group 1=serving TRP beams, group 2=neighbor TRP beams, and group 3=neighbor UE beams.

In this case, for a group k (k=1, 2, 3), the network may instruct the UE to include best $N_k$ beam index(es) in the feedback information ($N=N_1+N_2+N_3$).

As another embodiment, after grouping for each TRP or UE, the network may specify the number of beam indexes to be provided as feedback for each group.

Second Embodiment

The second embodiment is related to an UL beam management method which takes into account a neighboring TRP and a neighboring UE.

In the second embodiment, similarly to the method of the first embodiment described above, not only a neighboring UE but also a neighboring TRP participate in the transmission of an UL beam management RS.

FIG. 6 illustrates one example of an uplink beam management method proposed by the present specification, and FIG. 7 illustrates one example of a DL and UL resource structures in an uplink beam management method proposed by the present specification.

To perform an UL beam scanning/tracking process, the network configures (or indicates) M1 non-zero power (NZP) uplink reference signals (for example, an SRS), M2 zero-power (ZP) uplink reference signals (for example, an SRS) and/or M3 zero-power (ZP) downlink reference signals (for example, CSI-RS or BRS) for a UE.

The zero-power (ZP) reference signal implies that a time/frequency resource of the corresponding reference signal is muted. For example, a physical uplink shared channel (PUSCH) or physical uplink control channel (PUCCH) may be made not to be mapped to the RE position indicated by the ZP reference signal.

If the time/frequency resource area of the reference signal belongs to a physical channel transmission area, the muting may be interpreted as a puncturing or rate matching operation.

The zero-power downlink reference signal implies that UL resource elements corresponding to the time/frequency resource of a downlink reference signal for DL beam management are muted.

For example, suppose the position of an RS in UL and DL is configured as shown in FIG. 7a.

At this time, if the network configures or indicates a UE with the following signals of (1) to (3), the UE mutes a resource corresponding to SRS resource #2(ZP uplink reference signal) and CSI-RS resource #1(ZP downlink reference signal) and transmits an SRS from a resource corresponding to SRS resource #1(NZP uplink reference signal) for UL as shown in FIG. 7b.

(1) non-zero-power uplink reference signal=SRS resource #1
(2) zero-power uplink reference signal=SRS resource #2
(3) zero-power downlink reference signal=CSI-RS resource #1

In other words, if resources are configured as shown in FIG. 7b, other TRP(s) and other UE(s) are allowed to transmit an RS for UL beam management at the muted resource.

In the same way, to perform the operation described above, a serving TRP (or serving eNB) may request a neighboring TRP(s) (or neighboring eNB(s)) to transmit a downlink reference signal at a specific timing corresponding to an UL subframe of the serving TRP and provide information of a resource to be muted corresponding to the position of an uplink reference signal.

Also, to solve an issue of controlling difficult interference caused by a difference between DL and UL slot structures, the serving TRP may directly request a neighboring TRP(s) to transmit an uplink reference signal using a specific time/frequency resource and/or sequence.

In this case, the network may suffice to configure only the ZP uplink reference signal to be transmitted by a neighboring TRP/UE together with an NZP uplink reference signal to UEs.

FIG. 8 is a flow diagram illustrating one example of a method for controlling inter-beam interference proposed by the present specification.

More specifically, FIG. 8 illustrates one example of a DL beam management method considering a neighboring eNB and/or neighboring UE.

First, a serving eNB configures, for a UE, a plurality of beam management reference signals (RSs) for downlink beam scanning of the UE S810.

At the S810 step, the serving eNB may transmit at least one of information about a DL or UL reference signal QCLed with the corresponding beam management reference signal, sequence information used for each beam management reference signal, and grouping information about the plurality of beam management reference signals.

The grouping information about the plurality of beam management reference signals may include information representing the number of beam indexes to be provided as feedback with respect to each beam group.

Also, the beam index information corresponding to the predetermined number of Tx beams may include information representing the number of beam indexes to be provided as feedback, configured for each beam group.

Here, the serving eNB may be called or expressed by a network or a serving TRP.

Here, the plurality of beam management reference signals may include at least one of a beam management reference signal transmitted from a neighboring eNB(s) or a beam management reference signal transmitted from a neighboring UE(s).

The neighboring UE represents a UE located in the surroundings of the UE, which may be expressed by a neighbor UE.

The beam management reference signal may be a channel state information (CSI)-RS, Beam RS (BRS), or SS block.

Afterwards, the serving eNB transmits, to the UE, at least one beam management reference signal through at least one Tx beam S820.

Afterwards, the serving eNB receives beam index information corresponding to a predetermined number of Tx beams from the UE S830.

The beam indexes corresponding to the predetermined number of Tx beams may be Tx beam indexes corresponding to beam management reference signals the strength of which is larger than a threshold among the measurements of the plurality of beam management reference signals.

Afterwards, the serving eNB transmits, to the neighboring eNB and/or neighboring UE, a downlink reference signal of the neighboring eNB and/or indication information controlling beams used for transmission of an uplink reference signal of the neighboring UE based on the received beam index information S840.

The indication information may be information that instructs to exclude the predetermined number of Tx beams from being used for transmission of a downlink reference signal of the neighboring eNB and/or transmission of an uplink reference signal of the neighboring UE at a specific resource.

In addition, the serving eNB may transmit control information related to a beam management reference signal configured for the UE to at least one of the neighboring eNB(s) or the neighboring UE(s).

The control information may include at least one of at least one position information of a time resource or frequency resource to which a beam management reference signal set to the UE is transmitted, sequence information used for the set beam management reference signal, time and frequency synchronization information based on a downlink between the serving eNB and the UE, reference signal information used as a reference for power control, or power control command.

FIG. 9 is a flow diagram illustrating another example of a method for controlling inter-beam interference proposed by the present specification.

More specifically, FIG. 9 illustrates one example of an UL beam management method considering a neighboring eNB and/or neighboring UE.

First, a serving eNB configures, for a UE, a plurality of beam management reference signals (RSs) for uplink beam scanning of the UE S910.

The plurality of beam management reference signals include at least one of M1 non-zero-power (NZP) uplink reference signals, M2 zero-power (ZP) uplink reference signals, or M3 zero-power (ZP) downlink reference signals.

Afterwards, the serving eNB transmits a transmission request of a downlink reference signal and resource information about an uplink reference signal to be muted at a specific timing of an uplink (UL) subframe to at least one of a neighboring eNB(s) or a neighboring UE(s) S920.

Here, among the plurality of beam management reference signals, a beam management reference signal may be a sounding reference signal (SRS).

An uplink reference signal in the non-zero-power (NZP) uplink reference signal and the zero-power (ZP) uplink reference signal is an SRS, and a downlink reference signal in the zero-power (ZP) downlink reference signal is a channel state information-reference signal (CSI-RS).

Apparatus in General to which the Present Invention may be Applied

FIG. 10 illustrates a block diagram of a wireless communication device according to one embodiment of the present invention.

Referring to FIG. 10, a wireless communication system comprises an eNB 1010 and a plurality of UEs 1020 located within the range of the eNB 1010.

The eNB 1010 comprises a processor 1011, memory 1012, and RF (Radio Frequency) unit 1013. The processor 1011 implements the functions, processes and/or methods described with reference to FIGS. 1 to 9. Layers of a wireless interface protocol may be implemented by the processor 1011. The memory 1012, being connected to the processor 1011, stores various kinds of information to operate the processor 1011. The RF unit 1013, being connected to the processor 1011, transmits and/or receives a radio signal.

The UE 1020 comprises a processor 1021, memory 1022, and RF unit 1023.

The processor 1021 implements the functions, processes and/or methods described with reference to FIGS. 1 to 9. Layers of a wireless interface protocol may be implemented by the processor 1021. The memory 1022, being connected to the processor 1021, stores various kinds of information to operate the processor 1021. The RF unit 1023, being connected to the processor 1021, transmits and/or receives a radio signal.

The memory 1012, 1022 may be installed inside or outside the processor 1011, 1021 and may be connected to the processor 1011, 1021 via various well-known means.

As one example, to transmit and receive DL data in a wireless communication system providing low latency services, a UE may include a RF unit for transmitting and receiving a radio signal; and a processor functionally connected to the RF unit.

Also, the eNB 1010 and/or the UE 1020 may be equipped with a single antenna or multiple antennas.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like which perform the functions or operations described above.

Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

INDUSTRIAL APPLICABILITY

This document discloses a beam management method in a wireless communication system with examples based on the 3GPP LTE/LTE-A and 5G system; however, the present invention may be applied to various other types of wireless communication systems in addition to the 3GPP LTE/LTE-A and 5G system.

The invention claimed is:

1. A method of managing a beam in a wireless communication system, the method performed by a serving base station (BS) and comprising:
   transmitting, to a user equipment (UE), configuration information related to a plurality of beam management reference signals for downlink beam scanning of the UE,
   wherein the plurality of beam management reference signals include a first beam management reference signal to be transmitted from the serving BS, a second beam management reference signal to be transmitted from a neighboring BS, and a third beam management reference signal to be transmitted from a neighboring UE, and
   wherein the plurality of beam management reference signals are transmitted to the UE based on a plurality of transmission beams;
   transmitting control information related to the plurality of beam management reference signals to the neighboring BS and the neighboring UE;
   receiving, from the UE, beam index information related to a predetermined number of the plurality of transmission beams; and based on the received beam index information, transmitting indication information for controlling a beam used for transmission of a downlink reference signal of the neighboring BS to the neighboring BS, and transmitting indication information for controlling a beam used for transmission of an uplink reference signal of the neighboring UE to the neighboring UE, wherein a resource of the third beam management reference signal is configured on uplink resources of the UE, and wherein beam measurement is performed by the UE in the resource of the third beam management reference signal.

2. The method of claim 1, wherein the indication information instructs to exclude the predetermined number of the plurality of transmission beams from being used for transmission of a downlink reference signal by the neighboring BS and transmission of an uplink reference signal by the neighboring UE.

3. The method of claim 1, wherein beam indexes corresponding to the predetermined number of the plurality of transmission beams are transmission beam indexes related to beam management reference signals, the signal strength of which are larger than a threshold value among measurements of the plurality of beam management reference signals.

4. The method of claim 1, wherein the plurality of beam management reference signals include a channel state information (CSI)-RS, beam RS (BRS), or synchronization signal block.

5. The method of claim 1, wherein the control information includes at least one of (i) position information of time resources or frequency resources of the plurality of beam management reference signals, (ii) sequence information used for the plurality of beam management reference signals, (iii) reference signal information used as a reference for power control, and (iv) a power control command.

6. The method of claim 1, wherein the configuration information further comprises at least one of (i) information about a downlink and/or uplink reference signal having a Quasi-Co Location (QCL) relationship with each of the plurality of beam management reference signals, (ii) sequence information used for each of the plurality of beam management reference signals, or (iii) grouping information about the plurality of beam management reference signals.

7. The method of claim 6, wherein the grouping information includes information about the number of beam indexes to be provided as feedback for each beam group.

8. The method of claim 7, wherein the beam index information related to the predetermined number of the plurality of transmission beams includes information for the number of beam indexes to be provided as feedback configured for each beam group.

9. A method of managing a beam in a wireless communication system, the method performed by a serving base station (BS) and comprising:

transmitting, to a user equipment (UE), configuration information related to a plurality of beam management reference signals for uplink beam scanning of the UE, wherein the plurality of beam management reference signals include non-zero-power (NZP) uplink reference signals, zero-power (ZP) uplink reference signals, and zero-power (ZP) downlink reference signals; and transmitting, to a neighboring BS, a transmission request of a downlink reference signal at resources for the ZP downlink reference signals in uplink resources for the UE and transmitting, to a neighboring UE, a transmission request of an uplink reference signal at resources for the ZP uplink reference signals in uplink resources for the UE, wherein a rate matching of puncturing is performed by the UE at the resources for the ZP downlink reference signals and at the resources for the ZP uplink reference signals in the uplink resources, and wherein beam measurement is performed by the UE at the resources for the ZP downlink reference signals and at the resources for the ZP uplink reference signals in the uplink resources.

10. The method of claim 9, wherein the plurality of beam management reference signals include a sounding reference signal (SRS).

11. The method of claim 9, wherein an uplink reference signal in the NZP uplink reference signal and the ZP uplink reference signal include an SRS, and a downlink reference signal in the ZP downlink reference signal includes a channel state information-reference signal (CSI-RS).

12. A transmission apparatus configured to perform a beam management in a wireless communication system, the transmission apparatus comprising:

a radio frequency (RF) unit; and a processor functionally connected to the RF unit, wherein the processor is configured to:

transmit, to a user equipment (UE), configuration information related to a plurality of beam management reference signals for downlink beam scanning of the UE, wherein the plurality of beam management reference signals include a first beam management reference signal to be transmitted from a serving base stations (BS), a second beam management reference signal to be transmitted from a neighboring BS, and a third beam management reference signal to be transmitted from a neighboring UE, wherein the plurality of beam management reference signals are transmitted to the UE based on a plurality of transmission beams;

transmit control information related to the plurality of beam management reference signals to the neighboring BS and the neighboring UE;

receive, from the UE, beam index information related to a predetermined number of the plurality of transmission beams; and based on the received beam index information, transmit indication information for controlling a beam used for transmission of a downlink reference signal of the neighboring BS to the neighboring BS, and transmit indication information for controlling a beam used for transmission of an uplink reference signal of the neighboring UE to the neighboring UE, wherein a resource of the third beam management reference signal is configured on uplink resources of the UE, and wherein beam measurement is performed by the UE in the resource of the third beam management reference signal.

* * * * *